United States Patent
Rhee et al.

(10) Patent No.: US 9,791,327 B2
(45) Date of Patent: Oct. 17, 2017

(54) TEMPERATURE VOLTAGE GENERATOR (71) Applicants: SK hynix Inc., Icheon (KR); SNU R&DB FOUNDATION, Seoul (KR)

(72) Inventors: Cyu-Yeol Rhee, Cheongju (KR); Hyunjoong Lee, Seoul (KR); Suhwan Kim, Seoul (KR)

(73) Assignees: SK HYNIX INC., Icheon (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 380 days.

(21) Appl. No.: 14/578,276

(22) Filed: Dec. 19, 2014

(65) Prior Publication Data

US 2015/0362379 A1 Dec. 17, 2015

(30) Foreign Application Priority Data

Jun. 17, 2014 (KR) .................. 10-2014-0073684

(51) Int. Cl.
G01K 7/00 (2006.01)
G01K 7/01 (2006.01)
G01K 7/25 (2006.01)

(52) U.S. Cl.
CPC ............ G01K 7/00 (2013.01); G01K 7/01 (2013.01); G01K 7/25 (2013.01)

(58) Field of Classification Search
CPC ............ G01K 7/00; G01K 7/01; G01K 7/25
See application file for complete search history.

(56) References Cited

U.S. PATENT DOCUMENTS

| 4,106,341 A * | 8/1978 | Serrano ............ G01K 7/25 257/470 |
| 5,095,227 A * | 3/1992 | Jeong .............. G01K 7/01 327/427 |
| 5,993,060 A * | 11/1999 | Sakurai ............ G01K 15/00 374/1 |
| 6,099,163 A * | 8/2000 | Goodwin ............ G01K 7/01 327/512 |
| 6,183,131 B1 * | 2/2001 | Holloway ............ G01K 7/21 327/512 |
| 7,078,954 B2 | 7/2006 | Watanabe |
| 2003/0214336 A1 * | 11/2003 | Watanabe ............ G01K 7/21 327/200 |
| 2006/0056485 A1 * | 3/2006 | Hartley ............ G01K 7/01 374/170 |
| 2007/0216468 A1 * | 9/2007 | Duarte ............ G01K 3/005 327/513 |

(Continued)

FOREIGN PATENT DOCUMENTS

| EP | 2 295 944 A2 | 3/2011 |
| JP | 2012-149904 A | 8/2012 |
| KR | 10-2012-0115863 A | 10/2012 |

Primary Examiner — Lisa Caputo
Assistant Examiner — Philip Cotey (57) ABSTRACT

A temperature voltage generator includes a control voltage generation circuit configured to receive a reference voltage and to output a control voltage that changes according to temperature, a temperature voltage generation circuit configured to amplify the control voltage and to output a temperature voltage that changes according to temperature, and a linear compensation circuit connected to the control voltage generation circuit and configured to improve the linearity of the temperature voltage.

11 Claims, 12 Drawing Sheets

(56) References Cited

U.S. PATENT DOCUMENTS

| | | | | |
|---|---|---|---|---|
| 2008/0018316 A1* | 1/2008 | Chang | ............... | G05F 3/30 |
| | | | | 323/313 |
| 2011/0026335 A1* | 2/2011 | Kwon | ............... | G11C 7/04 |
| | | | | 365/189.11 |
| 2011/0204873 A1* | 8/2011 | Jeong | ............... | G01K 7/22 |
| | | | | 324/71.1 |
| 2012/0183016 A1* | 7/2012 | Kanai | ............... | G01K 7/01 |
| | | | | 374/163 |
| 2012/0257648 A1* | 10/2012 | Jeong | ............... | G01K 7/00 |
| | | | | 374/163 |
| 2013/0002358 A1* | 1/2013 | Mitchell | ............... | G01D 3/036 |
| | | | | 330/289 |
| 2013/0134788 A1* | 5/2013 | Noguchi | ............... | H02J 1/00 |
| | | | | 307/75 |
| 2013/0147544 A1* | 6/2013 | Kim | ............... | G05F 3/242 |
| | | | | 327/538 |
| 2014/0247095 A1* | 9/2014 | Edwards | ............... | H03L 1/02 |
| | | | | 331/176 |

* cited by examiner

FIG. 1

<PRIOR ART>

TEMPERATURE VOLTAGE GENERATOR

The present application claims priority under 35 U.S.C. §119(a) to Korean Application Number 10-2014-0073684, filed on Jun. 17, 2014, in the Korean Intellectual Property Office, which is incorporated herein by reference in its entirety as set forth in full.

BACKGROUND

1. Technical Field

Embodiments of the present disclosure relate to a temperature voltage generator that generates a temperature voltage that changes according to temperature.

2. Related Art

In an interior of a semiconductor device, a temperature voltage, which changes according to temperature, is generated for the purpose of temperature compensation and the like, and temperature is measured using the generated temperature voltage.

Figure 1:
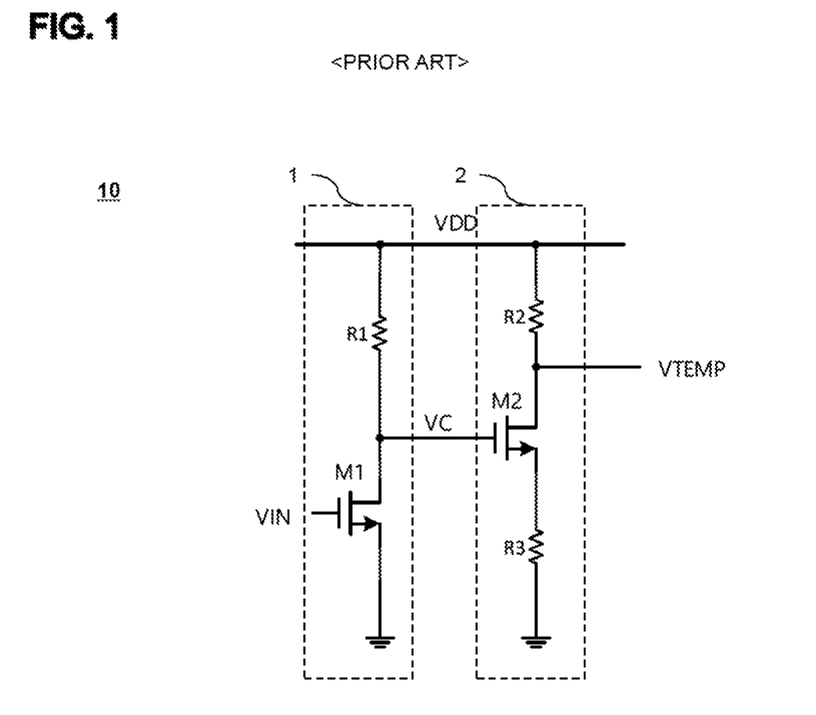
FIG. 1 is a circuit diagram of a temperature voltage generator according to the conventional art.

FIG. 1 is a circuit diagram of a temperature voltage generator 10 according to the conventional art.

The conventional temperature voltage generator 10 includes a control voltage generation circuit 1 that receives a reference voltage $V_{IN}$ and generates a control voltage $V_C$, and a temperature voltage generation circuit 2 that outputs a temperature voltage $V_{TEMP}$ according to the control voltage $V_C$.

The control voltage generation circuit 1 includes a first NMOS transistor M1 having a gate that receives the reference voltage $V_{IN}$, a source connected to a ground terminal, and a drain that outputs the control voltage $V_C$. A resistor R1 is connected between a power supply voltage terminal VDD and the drain of the first NMOS transistor M1.

The temperature voltage generation circuit 2 includes a second NMOS transistor M2, which has a gate that receives the control voltage $V_C$, a source connected to a resistor R2, and a drain connected to a resistor R3, and outputs the temperature voltage $V_{TEMP}$ through the drain terminal thereof. The resistor R2 is connected between the power supply voltage terminal VDD and the drain of the second NMOS transistor M2, and the resistor R3 is connected between the ground terminal and the source of the second NMOS transistor M2.

Figure 2:
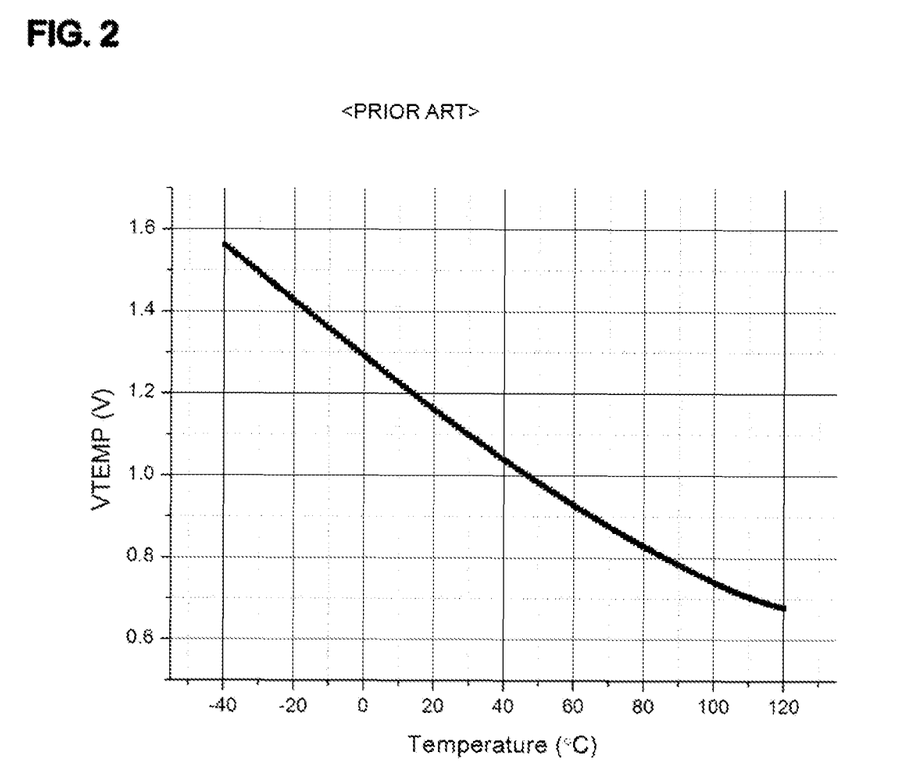
FIG. 2 is a graph of a temperature voltage that is outputted from a temperature voltage generator of FIG. 1.

FIG. 2 is a graph illustrating the temperature voltage $V_{TEMP}$ that is outputted from the conventional temperature voltage generator 10. As illustrated in FIG. 2, the conventional temperature voltage generator 10 outputs the temperature voltage $V_{TEMP}$ having a non-linear relation to temperature. When the temperature voltage $V_{TEMP}$ is non-linear, because a change amount of the temperature voltage changes according to a change in the temperature, accurately measuring the temperature may be problematic.

SUMMARY

Embodiments of the present disclosure are directed to a temperature voltage generator capable of outputting a temperature voltage that changes according to temperature and improving the linearity of the temperature voltage.

In an embodiment of the present disclosure, a temperature voltage generator includes: a control voltage generation circuit that receives a reference voltage and outputs a control voltage that changes according to temperature; a temperature voltage generation circuit that amplifies the control voltage and outputs a temperature voltage that changes according to temperature; and a linear compensation circuit connected to the control voltage generation circuit to compensate for linearity of the temperature voltage.

In the temperature voltage generator according to an embodiment, the linear compensation circuit may perform a function of reducing a size of a secondary component for temperature of the temperature voltage.

In the temperature voltage generator according to an embodiment, the linear compensation circuit may be connected between an output terminal of the control voltage generation circuit and a ground terminal.

In the temperature voltage generator according to an embodiment, the linear compensation circuit may include a resistor, a diode, or a transistor.

In the temperature voltage generator according to an embodiment, the control voltage generation circuit may include: a first resistor connected to a power terminal; and a first transistor having a source and drain connected between the first resistor and a ground terminal and a gate to which a reference voltage is applied.

In the temperature voltage generator according to an embodiment, the temperature voltage generation circuit may include: a second resistor connected to the power terminal; and a second transistor having a source and drain connected between the second resistor and the ground terminal and a gate to which the control voltage is applied.

In the temperature voltage generator according to an embodiment, the temperature voltage generation circuit may further include a resistor connected between the second transistor and the ground terminal.

In the temperature voltage generator according to an embodiment, the control voltage generation circuit may further include a first switch that controls a size of the first resistor by a first switching signal.

In the temperature voltage generator according to an embodiment, the temperature voltage generation circuit may further include a second switch that controls a size of the second resistor by a second switching signal.

The temperature voltage generator according to an embodiment may further include a reference voltage generation circuit that adjusts a size of the reference voltage by the first switching signal or the second switching signal, and outputs an adjusted reference voltage.

In the temperature voltage generator according to an embodiment, the reference voltage generation circuit may include: a voltage dividing section that divides a power supply voltage and outputs a plurality of divided voltages; and a voltage selecting section that selects one of the plurality of divided voltages according to the first switching signal or the second switching signal, and outputs a selected divided voltage as the reference voltage.

In the temperature voltage generator according to the present disclosure, the linearity of a temperature voltage is improved, so that it is possible to measure temperature more precisely.

BRIEF DESCRIPTION OF THE DRAWINGS

Features, aspects, and embodiments are described in conjunction with the attached drawings, in which:

FIG. 5a to FIG. 5d are graphs illustrating an effect of a temperature voltage generator of FIG. 4.

DETAILED DESCRIPTION

Hereinafter, a temperature voltage generator according to the present disclosure will be described in detail with reference to the accompanying drawings through illustrative embodiments.

Figure 3:
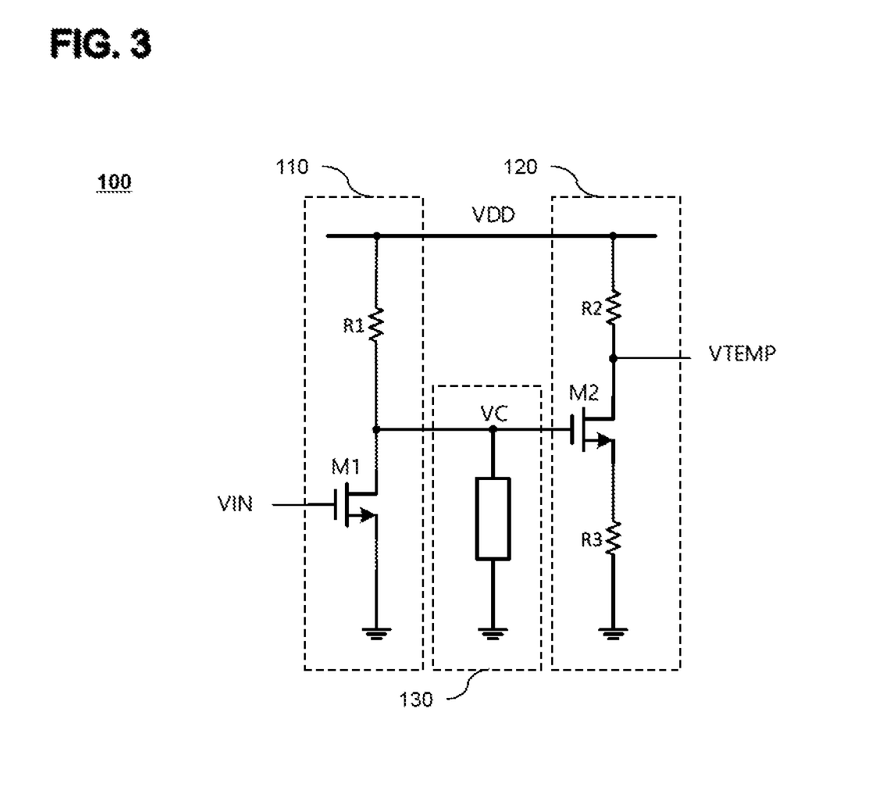
FIG. 3 is a circuit diagram of a temperature voltage generator according to an embodiment of the present disclosure.

FIG. 3 is a circuit diagram of a temperature voltage generator according to an embodiment of the present disclosure.

A temperature voltage generator 100 according to an embodiment includes a control voltage generation circuit 110 that receives a reference voltage $V_{IN}$ and generates a control voltage $V_C$, a temperature voltage generation circuit 120 that outputs a temperature voltage $V_{TEMP}$ according to the control voltage $V_C$, and a linear compensation circuit 130.

The linear compensation circuit 130 may be connected in parallel to the control voltage generation circuit 110. FIG. 3 illustrates an example in which the linear compensation circuit 130 is connected between an output terminal of the control voltage generation circuit 110 through which the control voltage $V_C$ is outputted and a ground terminal.

The control voltage generation circuit 110 includes a first NMOS transistor M1 having a gate that receives the reference voltage $V_{IN}$, a source connected to the ground terminal, and a drain that outputs the control voltage $V_C$. A first resistor R1 is connected between a power supply voltage terminal VDD and the drain of the first NMOS transistor M1.

The temperature voltage generation circuit 120 includes a second NMOS transistor M2, which has a gate that receives the control voltage $V_C$, a drain connected to a second resistor R2, and a source connected to the third resistor R3, and outputs the temperature voltage $V_{TEMP}$ through a drain terminal thereof.

The second resistor R2 is connected between the power supply voltage terminal VDD and the drain of the second NMOS transistor M2, and the third resistor R3 is connected between the ground terminal and the source of the second NMOS transistor M2.

Figure 4:
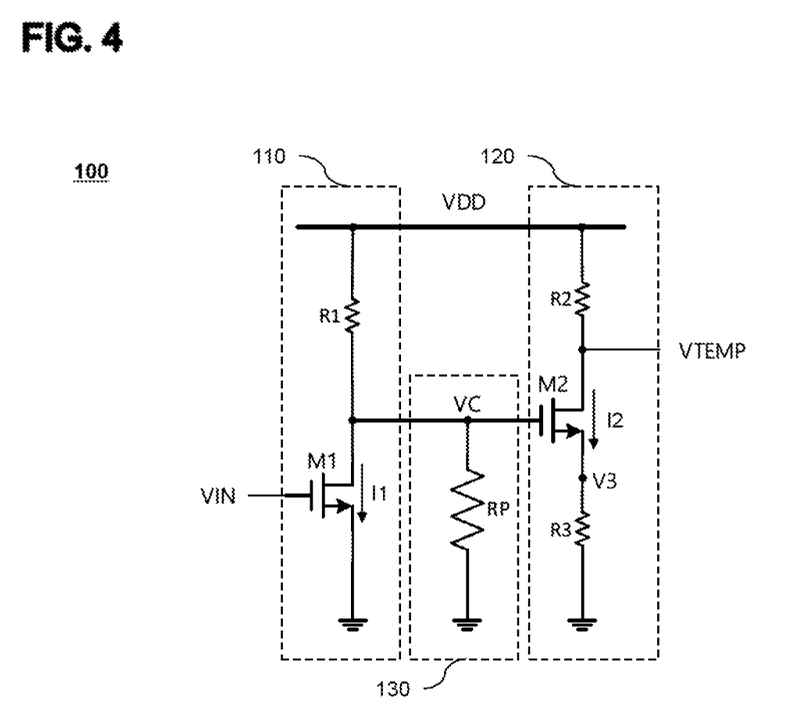
FIG. 4 is a circuit diagram of a temperature voltage generator in which a linear compensation circuit includes a resistor.

The linear compensation circuit 130 may be implemented using various circuit elements. In an embodiment, the linear compensation circuit 130 may be implemented using a compensation resistor RP as illustrated in FIG. 4. In other embodiments, the linear compensation circuit 130 may be implemented using an active element serving as a resistive element, a passive element, or both of the active element and the passive element.

Hereinafter, the principle by which the linearity of the temperature voltage $V_{TEMP}$ is improved through the operation of the linear compensation circuit 130 in FIG. 4 will be described using the equations below.

The first NMOS transistor M1 is set to operate in a linear region (a triode region). Accordingly, a source-drain current $I_1$ of the first NMOS transistor M1 may be expressed by the following Equation 1, wherein $\mu_1$ is a charge carrier mobility, $C_{ox1}$ a gate oxide capacitance per unit area, $W_1$ a gate width, $L_1$ a gate length, and a threshold voltage $V_{TH1}$ of the first NMOS transistor M1.

$$I_1 = \mu_1 C_{ox1}\left(\frac{W_1}{L_1}\right)\left[(V_{IN} - V_{TH1})V_C - \frac{V_C^2}{2}\right] \quad \text{(Eq. 1)}$$

The control voltage $V_C$ may be expressed by the following Equation 2, wherein $V_{DD}$ is a power supply voltage and $R_1$ is a resistance of the first resistor R1.

$$V_C = V_{DD} - I_1 R_1 \quad \text{(Eq. 2)}$$

The control voltage $V_C$ is calculated as follows from Equation 1 and Equation 2 above, wherein $R_P$ is a resistance of the compensation resistor RP.

$$V_C = V_{IN} - V_{TH1} + \frac{1}{\beta_1 R_1} + \frac{1}{\beta_1 R_P} - \sqrt{\left(V_{IN} - V_{TH1} + \frac{1}{\beta_1 R_1} + \frac{1}{\beta_1 R_P}\right)^2 - \frac{2 V_{DD}}{\beta_1 R_1}} \quad \text{(Eq. 3)}$$

In Equation 3 above, a gain $\beta_1$ of the first NMOS transistor M1 may be expressed by the following Equation 4.

$$\beta_1 = \mu_1 C_{ox1}\left(\frac{W_1}{L_1}\right) \quad \text{(Eq. 4)}$$

Since the gain $\beta_1$ and charge carrier mobility $\mu_1$ are related like the Equation 4 above and the charge carrier mobility $\beta_1$ may be expressed like the Equation 5 below, that gain $\beta_1$ may be expressed like the Equation 6 below.

$$\mu_1(T) = \mu_{10}\left(\frac{T}{T_0}\right)^{-m} \quad \text{(Eq. 5)}$$

$$\beta_1(T) = \beta_{10}\left(\frac{T}{T_0}\right)^{-m} \quad \text{(Eq. 6)}$$

In Equation 5 and Equation 6 above, $T_0$ denotes a reference temperature, T denotes an arbitrary temperature, m is a constant, and a reference temperature gain $\beta_{10}$ and a reference temperature charge carrier mobility $\mu_{10}$ are the values of the gain $\beta_1$ and the charge carrier mobility $\mu_1$ at the reference temperature $T_0$.

A threshold voltage $V_{TH}$ of a MOS transistor is a value that changes according to temperature as expressed by the following Equation 7, wherein $\alpha_{VTH}$ is a temperature constant and a reference temperature threshold voltage $V_{TH0}$ is a threshold voltage at the reference temperature $T_0$.

$$V_{TH}(T) = V_{TH0} - \alpha_{VTH}(T - T_0) \quad \text{(Eq. 7)}$$

In an embodiment, a resistance R of a resistor is modeled as a quadratic function according to temperature as expressed by the following Equation 8, wherein $\alpha_{R1}$ and $\alpha_{R2}$ are temperature constants and a reference temperature resistance $R_0$ is a resistance of the resistor at the reference temperature $T_0$.

$$R(T) = R_0[1 + \alpha_{R1}(T - T_0) + \alpha_{R2}(T - T_0)^2] \quad \text{(Eq. 8)}$$

A source-drain current $I_2$ of the second NMOS transistor M2 may be expressed by the following Equation 9.

$$I_2 = \frac{1}{2}\mu_2 Cox_2\left(\frac{W_2}{L_2}\right)(V_C - V_{RS} - V_{TH2})^2 \quad \text{(Eq. 9)}$$

In Equation 9 above, the drain voltage $V_3$ at the drain of the second NMOS transistor M2 and the temperature voltage $V_{TEMP}$ are expressed by the following Equation 10 and Equation 11, respectively, wherein $R_2$ represents a resistance of the second resistor R2 and $R_3$ represents a resistance of the third resister R3.

$$V_3 = I_2 R_3 \quad \text{(Eq. 10)}$$

$$V_{TEMP} = V_{VDD} - I_2 R_2 \quad \text{(Eq. 11)}$$

The temperature voltage $V_{TEMP}$ is calculated as follows from Equation 9, Equation 10, and Equation 11 above, wherein $V_{TH2}$ and $\beta_2$ denote a threshold voltage and a gain of the second NMOS transistor M2, respectively.

$$V_{TEMP} = \quad \text{(Eq. 12)}$$
$$V_{DD} - \frac{R_2}{R_3}\left[V_C - V_{TH2} + \frac{1}{\beta_2 R_3}\left(1 - \sqrt{1 + 2\beta_2 R_3(V_1 - V_{TH2})}\right)\right]$$

In FIG. 4, when the linear compensation circuit 130 does not exist, the control voltage $V_C$ of the conventional art is expressed by the following Equation 13.

$$V_C = V_{IN} - V_{TH1} + \frac{1}{\beta_1 R_1} - \sqrt{\left(V_{IN} - V_{TH1} + \frac{1}{\beta_1 R_1}\right)^2 - \frac{2V_{DD}}{\beta_1 R_1}} \quad \text{(Eq. 13)}$$

The temperature voltage according to an embodiment is obtained by putting Equation 8 into Equation 12, and the temperature voltage according to the conventional art is obtained by putting Equation 13 into Equation 12. In each case, the resistance of each of the first, second, third, and compensation resistors R1, R2, R3, and RP is modeled using Equation 8.

When the obtained temperature voltage $V_{TEMP}$ is deployed by a Taylor series in temperature, a factor having the largest influence on the linearity of the temperature voltage $V_{TEMP}$ is a coefficient of a quadratic term.

As a result of the calculation, the coefficient of the quadratic term according to the conventional art is expressed by the following Equation 14, and the coefficient of the quadratic term according to an embodiment is expressed by the following Equation 15, wherein $R_{10}$ is a reference temperature resistance of the first resistor R1, and $R_{P0}$ is a reference temperature resistance of the compensation resistor RP.

$$\frac{C_1}{2R_{10}T_0^2\beta_{10}(1 + R_{10}\beta_{10}(-2(V_{DD} - V_{IN} + V_{TH10}) + R_{10}(V_{IN} + V_{TH10})^2\beta_{10}))^2} \quad \text{(Eq. 14)}$$

$$\frac{(C_2)}{\left(2R_{10}R_{P0}T_0^2\beta_{10}(R_{P0}^2 + 2R_{10}R_{P0}(1 - R_{10}(V_{DD} - V_{IN} + V_{TH10})\beta_{10}) + (R_{10} + R_{10}R_{P0}(V_{IN} - V_{TH10})^2\beta_{10})^2\right)} \quad \text{(Eq. 15)}$$

In Equation 14 and Equation 15 above, $C_1$ and $C_2$, which are constants corresponding to the numerators, are not equal to each other, but, in the denominator parts, Equation 15 has a value significantly larger than that of Equation 14 due to the presence of resistor component, reference temperature resistance $R_{P0}$, of the linear compensation circuit 130. In spite of the difference in the constant parts, the value of Equation 15 is significantly smaller than the value of Equation 14, and as a result, the quadratic component for temperature of the temperature voltage $V_{TEMP}$ is reduced in the embodiment.

The description using the above Equations is based on the assumption that the linear compensation circuit 130 is a resistor, but the linear compensation circuit 130 may be implemented by other types of passive elements that may be modeled by a temperature-based polynomial as expressed by Equation 8, or implemented by active elements such as transistors or diodes, or implemented by a combination thereof.

Furthermore, FIG. 4 illustrates an embodiment in which the linear compensation circuit 130 is connected between the output terminal of the control voltage $V_C$ and the ground terminal, but other connection schemes capable of improving the linearity of the temperature voltage $V_{TEMP}$ may exist and it should be noted that these also belong to the scope of the present disclosure.

The improvement in the linearity of the temperature voltage $V_{TEMP}$ will be described in more detail with reference to simulation graphs.

FIG. 5a to FIG. 5d are graphs illustrating an effect of an embodiment.

Figure 5A:
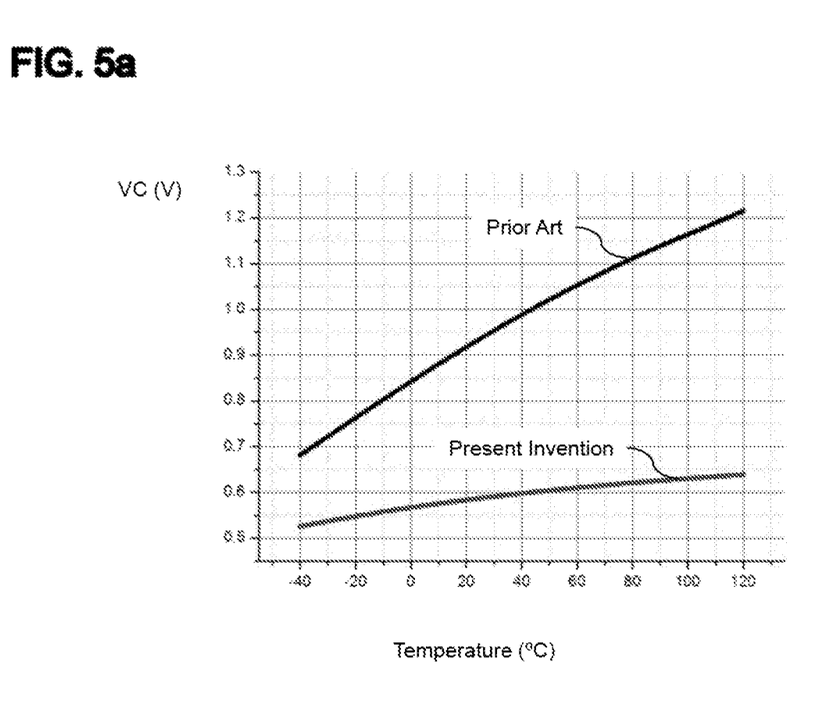
Figure 5B:
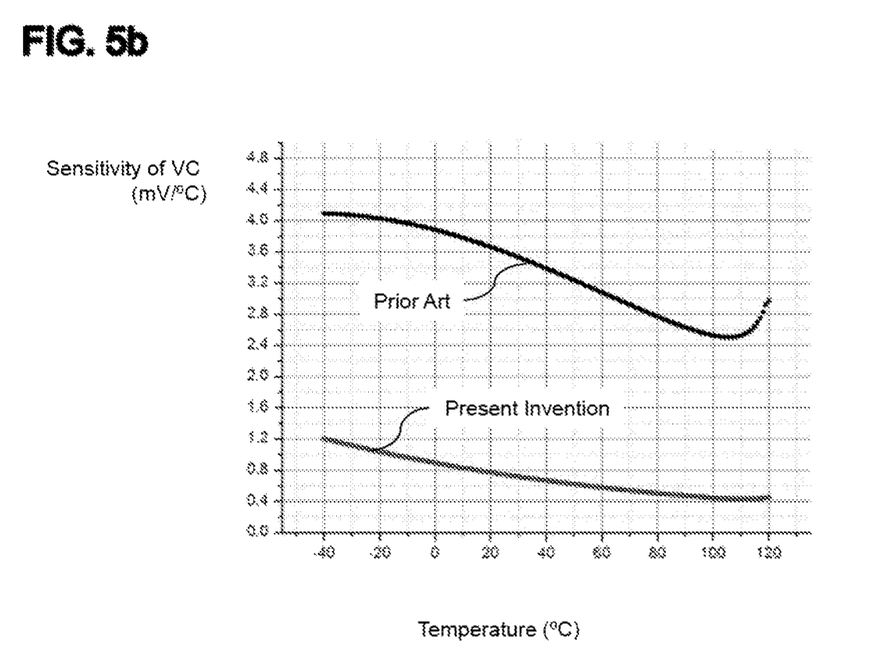

In FIG. 5a, the linearity of the control voltage $V_C$ in an embodiment is compared with the linearity of the control voltage $V_C$ in the conventional art, and in FIG. 5b, a rate of variation based on temperature of the control voltage $V_C$ in an embodiment is compared with a rate of variation based on temperature of the control voltage $V_C$ in the conventional art.

As illustrated in FIG. 5a, in the present embodiment, the linearity of the control voltage $V_C$ is improved as compared with the conventional art. This is confirmed through FIG. 5b. Referring to FIG. 5b, in the case of the present embodiment, the rate of variation of the control voltage $V_C$ more closely approximates a horizontal line as compared with the conventional art. This represents that the coefficient of the quadratic term for temperature of the control voltage $V_C$ approaches zero, thereby demonstrating that the linearity of the control voltage $V_C$ is improved.

Figure 5C:
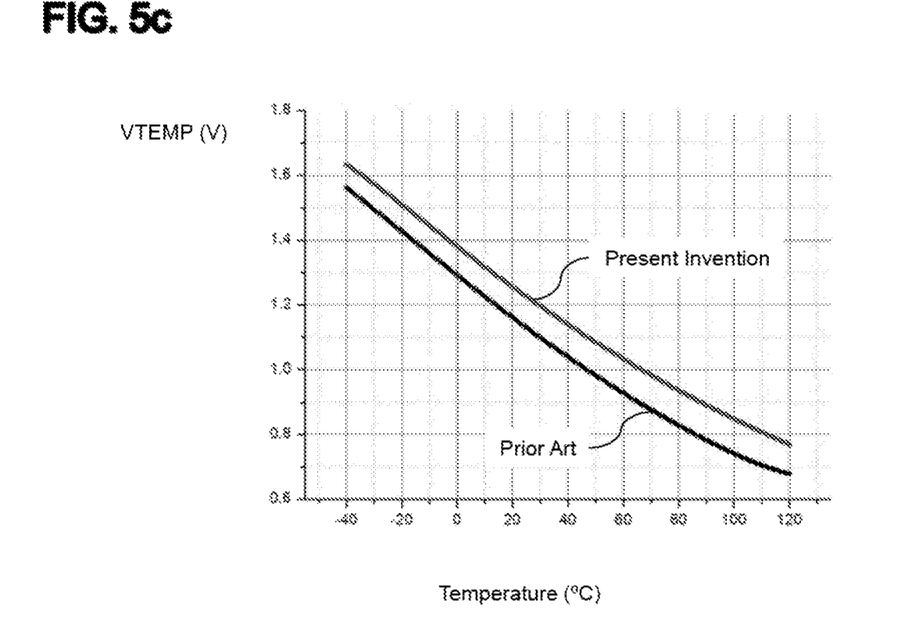
Figure 5D:
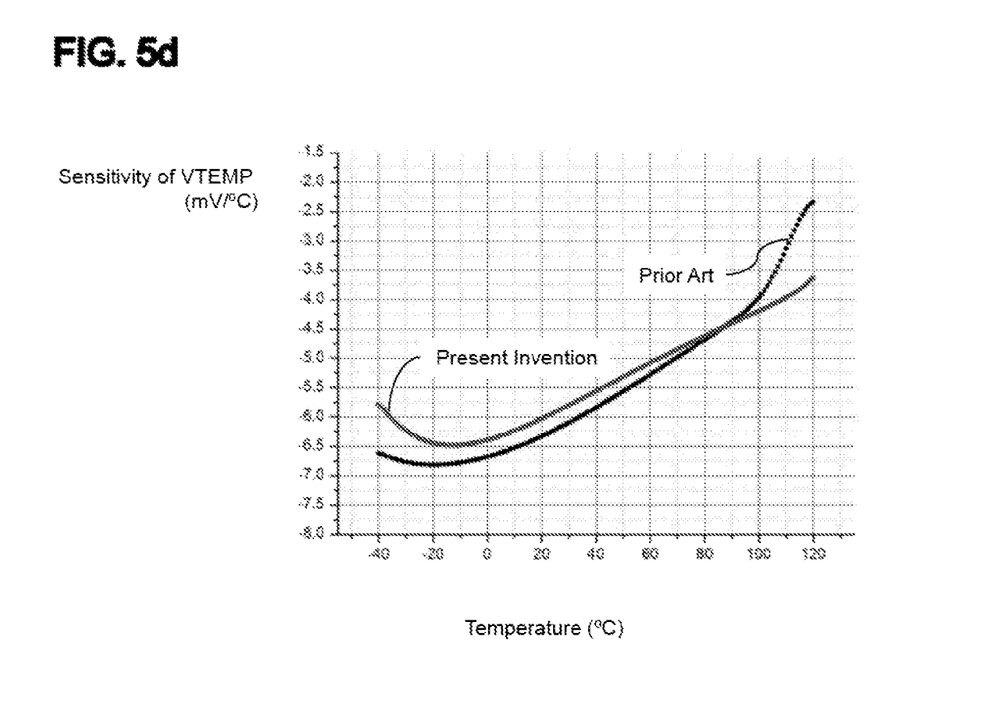

In FIG. 5c, the linearity of the temperature voltage $V_{TEMP}$ in an embodiment is compared with the linearity of the temperature voltage $V_{TEMP}$ in the conventional art, and in FIG. 5d, a rate of variation based on temperature of the temperature voltage $V_{TEMP}$ in an embodiment is compared with a rate of variation based on temperature of the temperature voltage $V_{TEMP}$ in the conventional art.

As illustrated in FIG. 5c, in the present embodiment, the linearity of the temperature voltage $V_{TEMP}$ is improved as compared with the conventional art. This is confirmed through FIG. 5d. Referring to FIG. 5d, in the case of the present embodiment, the rate of variation in a relatively low temperature section equal to or less than 100° C. more closely approximates a horizontal line as compared with the conventional art. This represents that the coefficient of the quadratic term for temperature of the temperature voltage $V_{TEMP}$ in a corresponding section approaches zero, thereby demonstrating that the linearity of the temperature voltage $V_{TEMP}$ is improved.

Figure 6:
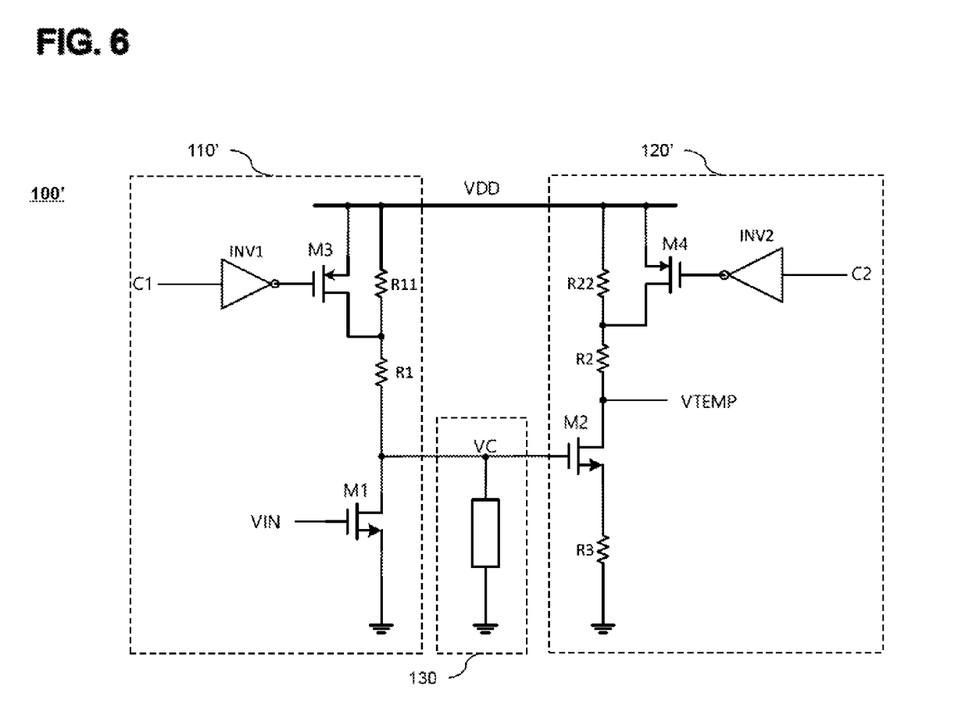
FIG. 6 is a circuit diagram of a temperature voltage generator according to another embodiment.

FIG. 6 is a circuit diagram of a temperature voltage generator 100' according to another embodiment of the present disclosure.

The temperature voltage generator 100' has a different configuration from the temperature voltage generator 100 of FIG. 3. The temperature voltage generator 100' includes a control voltage generation circuit 110', a temperature voltage generation circuit 120', and a linear compensation circuit 130.

Compared to the control voltage generation circuit 110 of FIG. 3, the control voltage generation circuit 110' further includes a fourth resistor R11 connected between the first resistor R1 and the power supply voltage terminal VDD, a first switch M3 connected across the fourth resistor R11, and a first switch control circuit INV1 configured to control the first switch M3 according to a first switch control signal C1. Compared to the temperature voltage generation circuit 120 of FIG. 3, the temperature voltage generation circuit 120' further includes a fifth resistor R22 connected between the second resister R2 and the power supply voltage terminal VDD, a second switch M4 connected across the fifth resistor R22, and a second switch control circuit INV2 configured to control the second switch M4 according to a second switch control signal C2. In the embodiment of FIG. 6, the first and second switches M3 and M4 each include a PMOS transistor.

A resistance of the control voltage generation circuit 110' is selected as a resistance of the first resistor R1 or as a sum of resistances of the first resistor R1 and the fourth resistor R11 according to the first switch control signal C1, and a resistance of the temperature voltage generation circuit 120' is selected as a resistance of the second resistor R2 or as a sum of resistances of the second resistor R2 and the fifth resistor R22 according to the second switch control signal C2.

It will be understood to those skilled in the art that the resistances of the control voltage generation circuit 110' and the temperature voltage generation circuit 120' and the reference voltage $V_{IN}$ are adjusted with reference to Equations 3 and 12 above, so that it is possible to adjust the slope and the DC bias of the temperature-voltage graph.

In the temperature voltage generator 100' of FIG. 6, it is possible to further adjust the resistances of the control voltage generation circuit 110' and the temperature voltage generation circuit 120' according to the first and second switch control signals C1 and C2.

Figure 7:
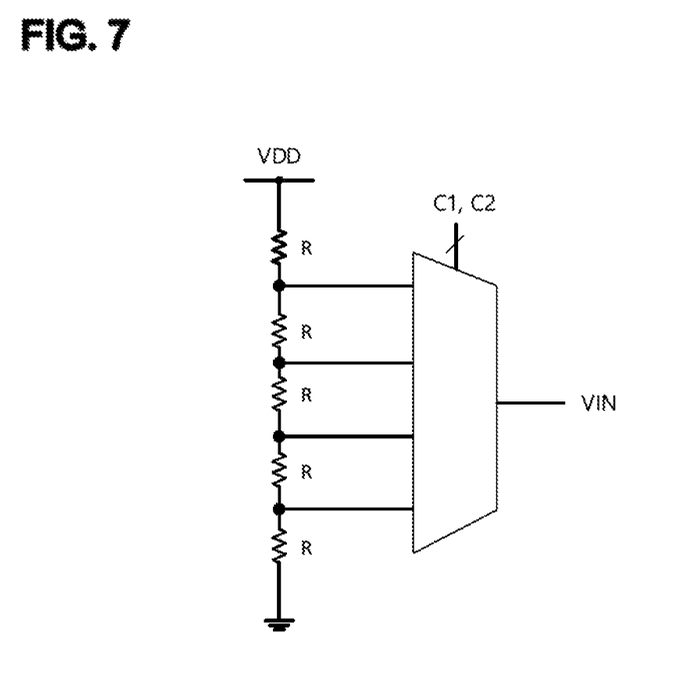
FIG. 7 is a circuit diagram of a reference voltage generation circuit.

FIG. 7 illustrates a reference voltage generation circuit. In FIG. 7, one of a plurality of divided voltages obtained by voltage-dividing the power supply voltage VDD through a plurality of resistors R may be selected using the first and second switch control signals C1 and C2, and the selected voltage may be outputted as the reference voltage $V_{IN}$.

Consequently, in the temperature voltage generator 100' of FIG. 6, it is possible to adjust the first and second switch control signals C1 and C2 to generate temperature-voltage graphs having various slopes and DC bias voltages. When the principle is applied, it is possible to generate temperature-voltage graphs having different shapes in different temperature sections as illustrated in FIG. 8a and FIG. 8b.

Figure 8A:
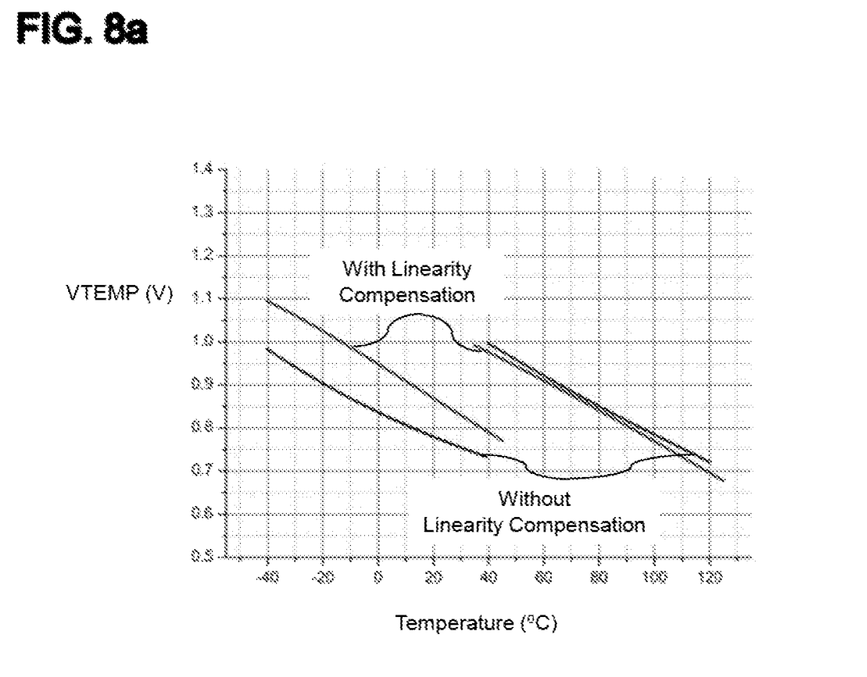
FIG. 8a and FIG. 8b are graphs illustrating an effect of a temperature voltage generator of FIG. 6.
Figure 8B:
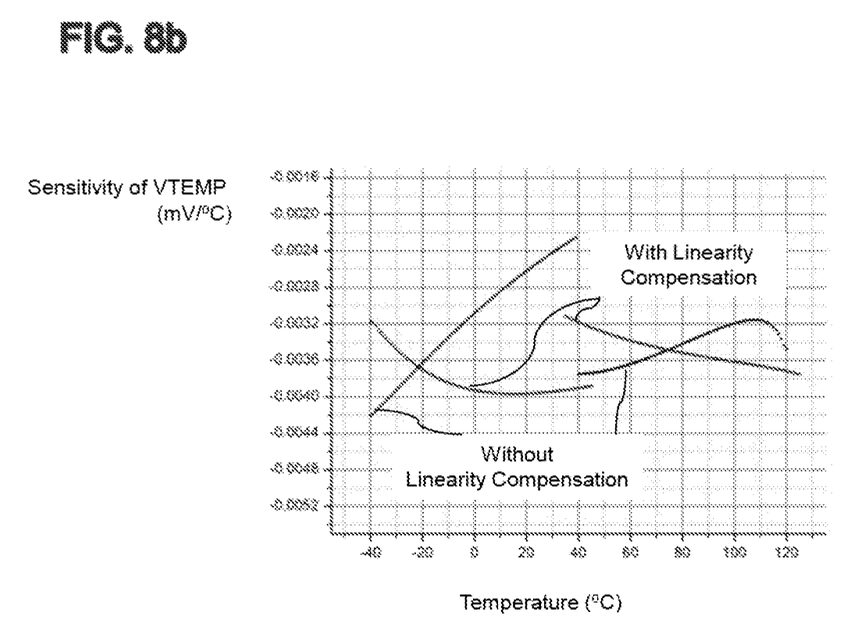

For example, values of the first and second switch control signals C1 and C2 used in a first temperature section (40° C. to 120° C.) and values of the first and second switch control signals C1 and C2 used in a second temperature section (−40° C. to 40° C.) are set to be different from each other, so that it is possible to obtain two discontinuous graphs, instead of one continuous graph, as illustrated in FIG. 8a and FIG. 8b. Depending on the number of temperature sections and combinations of the first and second switch control signals C1 and C2, two or more discontinuous graphs may be generated.

FIG. 8a and FIG. 8b are graphs illustrating a rate of variation of the temperature voltage $V_{TEMP}$ when the temperature voltage generator 100' of FIG. 6 includes the linear compensation circuit 130 and a rate of variation of the temperature voltage $V_{TEMP}$ when the temperature voltage generator 100' of FIG. 6 does not include the linear compensation circuit 130.

As illustrated in FIG. 8a, when the temperature voltage generator 100' includes the linear compensation circuit 130, the linearity is improved as compared with the case in which the temperature voltage generator 100' does not include the linear compensation circuit 130. Referring to FIG. 8b, when the temperature voltage generator 100' includes the linear compensation circuit 130, since the rate of variation more closely approximates a horizontal line, it demonstrates that the linearity of the temperature voltage $V_{TEMP}$ is improved.

While certain embodiments have been described above, it will be understood to those skilled in the art that the embodiments described are by way of example only. Accordingly, the temperature voltage generator described herein should not be limited based on the described embodiments. Rather, the temperature voltage generator described herein should only be limited in light of the claims that follow when taken in conjunction with the above description and accompanying drawings.

What is claimed is:

1. A temperature voltage generator comprising:
    a control voltage generation circuit configured to receive a reference voltage and to output a control voltage that changes according to temperature;
    a temperature voltage generation circuit configured to amplify the control voltage to output a temperature voltage that changes according to temperature; and
    a linear compensation circuit connected to an output terminal of the control voltage generation circuit and configured to improve the linearity of the temperature voltage and the linearity of the control voltage.

2. The temperature voltage generator according to claim 1, wherein the linear compensation circuit reduces a magnitude of a quadratic component for temperature of the temperature voltage.

3. The temperature voltage generator according to claim 1, wherein the linear compensation circuit is connected between the output terminal of the control voltage generation circuit and a ground terminal.

4. The temperature voltage generator according to claim 3, wherein the linear compensation circuit includes a resistor, a diode, a transistor, or a combination thereof.

5. The temperature voltage generator according to claim 1, wherein the control voltage generation circuit comprises:
    a first resistor connected to a power supply voltage terminal; and
    a first transistor having a drain and a source, which are connected to the first resistor and a ground terminal, respectively, and a gate to which the reference voltage is applied.

6. The temperature voltage generator according to claim 5, wherein the temperature voltage generation circuit comprises:
    a second resistor connected to the power supply voltage terminal; and a second transistor having a drain and a source, which are connected to the second resistor and the ground terminal, respectively, and a gate to which the control voltage is applied.

7. The temperature voltage generator according to claim 6, wherein the temperature voltage generation circuit further comprises:
a resistor connected between the second transistor and the ground terminal.

8. The temperature voltage generator according to claim 6, wherein the control voltage generation circuit further comprises:
a first switch configured to control a resistance of the first resistor according to a first switching signal.

9. The temperature voltage generator according to claim 8, wherein the temperature voltage generation circuit further comprises:
a second switch configured to control a resistance of the second resistor according to a second switching signal.

10. The temperature voltage generator according to claim 9, further comprising:
a reference voltage generation circuit configured to adjust a magnitude of the reference voltage according to the first switching signal, the second switching signal, or both of the first and second switching signals, and to output the reference voltage having an adjusted magnitude.

11. The temperature voltage generator according to claim 10, wherein the reference voltage generation circuit comprises:
a voltage dividing section configured to divide a power supply voltage and outputs a plurality of divided voltages; and
a voltage selecting section configured to select one of the plurality of divided voltages according to the first switching signal, the second switching signal, or both of the first and second switching signals, and to output a selected divided voltage as the reference voltage.

* * * * *